United States Patent
Garfinkel et al.

(10) Patent No.: US 7,392,484 B1
(45) Date of Patent: Jun. 24, 2008

(54) METHOD AND SYSTEM FOR CAPTURING, STORING, SHARING, AND MANAGING NOTES TAKEN DURING A COMPUTER BASED MEETING

(75) Inventors: Daniel Garfinkel, Fort Collins, CO (US); James Cooke, Fort Collins, CO (US); Maureen Gillis, Fort Collins, CO (US); Hugh-John Flemming, Fort Collins, CO (US); John Christopher Dale, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1073 days.

(21) Appl. No.: 09/687,774

(22) Filed: Oct. 13, 2000

(51) Int. Cl.
*G06F 17/00* (2006.01)

(52) U.S. Cl. ................ 715/751; 715/753; 715/232; 707/3

(58) Field of Classification Search ................ 715/514, 715/508, 530, 751, 964, 753, 232; 345/751, 345/752; 707/3
See application file for complete search history.

(56) References Cited

U.S. PATENT DOCUMENTS

| | | | | |
|---|---|---|---|---|
| 6,342,906 B1 * | 1/2002 | Kumar et al. | ................ | 345/751 |
| 6,487,569 B1 * | 11/2002 | Lui et al. | ................... | 715/530 |
| 6,564,246 B1 * | 5/2003 | Varma et al. | ................ | 709/205 |
| 6,594,693 B1 * | 7/2003 | Borwankar | ................. | 709/219 |
| 6,654,032 B1 * | 11/2003 | Zhu et al. | .................... | 345/753 |
| 2002/0032592 A1 * | 3/2002 | Krasnick et al. | ............... | 705/8 |
| 2003/0167281 A1 * | 9/2003 | Cohen et al. | ............ | 707/103 R |
| 2007/0208669 A1 * | 9/2007 | Rivette et al. | ................. | 705/59 |
| 2008/0046417 A1 * | 2/2008 | Jeffery et al. | .................. | 707/4 |

OTHER PUBLICATIONS

Conference Papers in English, Ana Sayfaya Donus, pp. 1-4 http://www3.itu.edu.tr/~nerdogan/yabbil.html.*
Conference Papers, pp. 1-7, http://www.cmpe.boun.edu.tr/~akin/bildiri.html.*
Adobe Press Office; Adobe Acrobat 4.0 Software Bridges the Gaps in Today's Office Documentation Workflows; Adobe System UK; Feb. 16, 1999; pp. 1-4.
Akin, M., "Nasneye Yonelik Tasarim Desenleri ve Uygulamalari," Istanbul Taknik Universitesi, FBE, 2000; "Using Object Oriented Design Patterns to Develop and Interactive Command System for a CAD Software with Undo and Redo Support," Proc. 15th International Symp. on Computer and Information Sciences (ISCIS XV), Istanbul, Turkey; 2000, pp. 410-417.

* cited by examiner

*Primary Examiner*—Stephen Hong
*Assistant Examiner*—Matthew J Ludwig

(57) ABSTRACT

A method and system for capturing and managing electronic notes in a computer based application is presented. Electronic notes are captured in a note object and the context of the captured note is associated to the note object. Note objects are stored in a notes database for later retrieval. The notes can be queried, filtered, and sorted to obtain useful information from the notes.

17 Claims, 9 Drawing Sheets

| Note ID | Note Type | Creation Time | Author | Last Modified Time | Last Modified By | Assigned To | Due Date | Status | Links List |
|---|---|---|---|---|---|---|---|---|---|
| A | | | | | | | | | |

FIG. 12

| Note ID | Links |
|---|---|
| A | |

FIG. 13

METHOD AND SYSTEM FOR CAPTURING, STORING, SHARING, AND MANAGING NOTES TAKEN DURING A COMPUTER BASED MEETING

FIELD OF THE INVENTION

The present invention pertains generally to computer-based meeting applications, and more particularly to a method and system for capturing, storing, sharing, and managing electronic notes generated in a computer based application.

BACKGROUND OF THE INVENTION

Computer based collaboration tools, which allow two or more remotely located users to simultaneously view data and communicate over a computer network, allow remotely located users to conduct online meetings. Just as in face-to-face meetings, the ability to take notes is important in online meetings for the purpose of capturing the events, issues, action items, and decisions made during the meeting. In the past, notes taken by participants of an online meeting are typically taken individually by the various meeting participants and then distributed via paper memos or email. The current computer-based note-taking capabilities are problematic for several reasons.

First, current solutions often do not capture enough context to understand the note (e.g., the issue or decision made during the online meeting). This is due in part to the fact that notes are often limited to text, missing important graphical information about what was being discussed (such as the state of the computer display) at the time the note was taken.

A further problem with current note-taking solutions is that captured notes are usually unmanaged, meaning that there is no way to query the system for decisions made at a meeting or about a particular subject or for action items assigned to specific people. It is often difficult to track the status of notes, such as the status of actions items.

Yet a further problem is that different participants take notes that often disagree with each other. This is especially true in the case where each participants' notes cannot be easily displayed to the other participants.

Accordingly, an improved online note-taking technique is needed that supports the capture, storage, sharing, management of, and extraction of information from notes generated during an online meeting.

SUMMARY OF THE INVENTION

The present invention is a method and system for capturing, storing, sharing and managing notes in a computer based software application. In particular, the invention is directed to collaborative online meeting environments, but may also be used in stand-alone computer applications which require note-taking and note-management capability.

In accordance with the invention, electronic notes are captured, preferably along with the creation time, author, and appropriate context information. For example, the topic under discussion and the current state of the display screen may also be captured and associated with the note. The context associated with the captured note thereby allows a user to more fully understand the meaning of the note when the note is retrieved at a later time.

The invention also allows users to categorize notes according to type (e.g., General, Action Item, Issue, Decision) and to query on specific note attributes (e.g., creation time, author, etc.) to retrieve information from the notes more quickly. The system also provides a mechanism for updating the status of the notes, thereby allowing users to see the current state of an issue or action item as well as the state at the time the note was created.

The system can be used in stand-alone environments as well as collaboration environments with multiple online meeting participants to capture, store, share, and manage notes.

In accordance with the invention, the system comprises a capture module, a storage module, a retrieval module, and a management module. The capture module provides the capability for capturing the note along with note-specific information and the state of the display screen.

The storage module provides the capability for storing captured information in persistent storage for later recall. The persistent storage module can be implemented in various ways, for example with a relational database or a document management system.

The retrieval module retrieves information from the persistent storage module and displays the results to the user. This module allows the user to specify the type of information to be retrieved.

The management module allows a user to update the status of the note, and with the appropriate permissions, modify the contents of and/or delete notes.

BRIEF DESCRIPTION OF THE DRAWING

The invention will be better understood from a reading of the following detailed description taken in conjunction with the drawing in which like reference designators are used to designate like elements, and in which:

FIG. 12 is an example embodiment of a Notes Table implementing a notes list for a particular meeting session; and FIG. 13 is an example embodiment of a Links Table implementing a list of links associated with a list of note objects.

DETAILED DESCRIPTION

Figure 1:
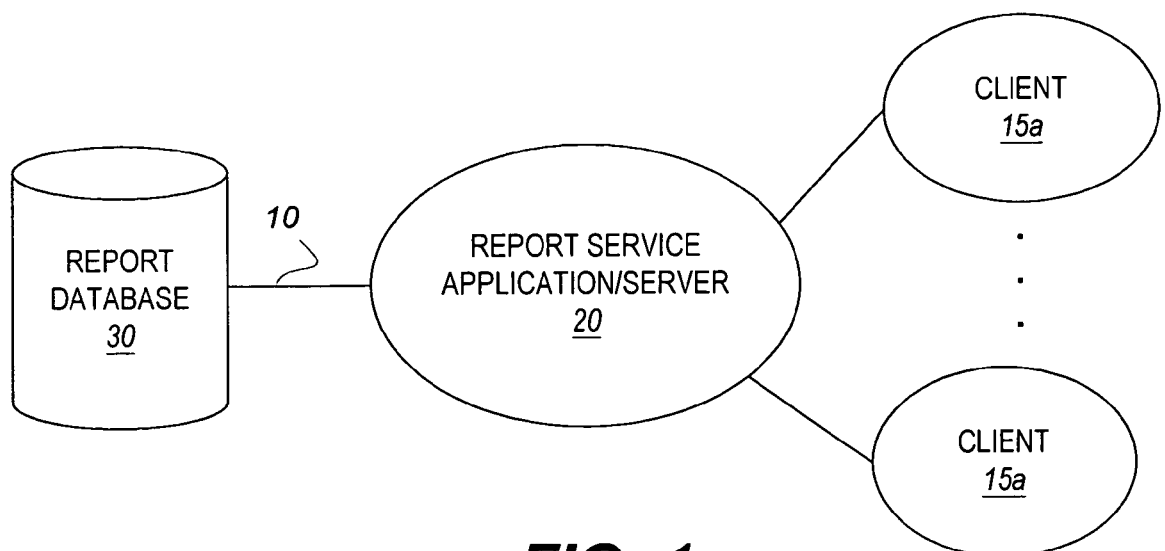
FIG. 1 is a block diagram of an illustrative embodiment of a system in accordance with the invention.

FIG. 1 is a block diagram of an illustrative embodiment of a system in accordance with the invention. As illustrated, the system includes a Notes Service 20, which may be implemented as a separate server application (as shown) which communicates with client applications 15a, ..., 15n to provide note capturing and management capability. In an alternative configuration, Notes Service 20 may be integrated within another application (not shown) that requires the services of the Notes Services 20, or it may be implemented in a peer-to-peer configuration.

Figure 2:
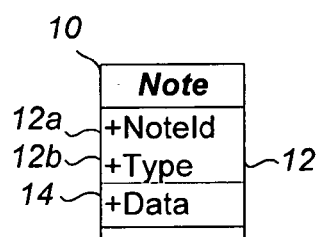
FIG. 2 is an object diagram of a note object that is used by the Notes Service of the invention to represent a user created note.

FIG. 2 is an object diagram of a note object 10 that is used by Notes Service 20 to represent a user created note. A note object 10 includes a set of note-descriptive attributes 12 and note data 14. Note-descriptive attributes 12 encompass information about the note object 10 itself, including a Note ID 12a, which uniquely identifies the note within the Notes Service 20, and a Note Type 12b. Each type of note identified by the Note Type 12b specifies additional (and possibly different) note-descriptive attributes associated with a note of the specified type.

The Note Data 14 attribute contains data captured by the note (i.e., the actual note content), such as ASCII text, image data, audio data, and other object data. The data contained in the Note Data 14 attribute is not interpreted by the Notes Service 20.

Figure 3:
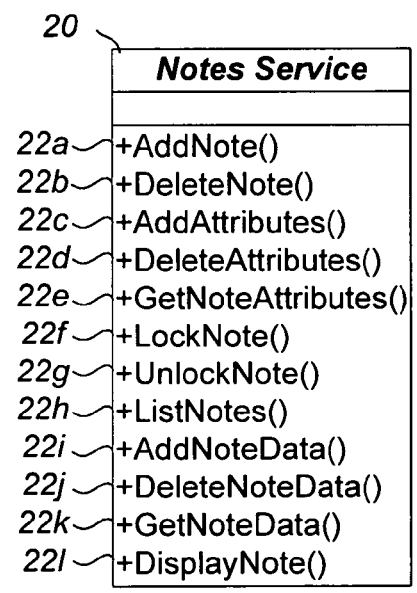
FIG. 3 is a class diagram of an illustrative embodiment of the Notes Service of the invention.

FIG. 3 is a class diagram of an illustrative embodiment of Notes Service 20. As illustrated, Notes Service 20 includes the methods: Add Note 22a, Delete Note 22b, Add Attributes 22c, Delete Attribute 22d, Get Note Attributes 22e, Lock Note 22f, Unlock Note 22g, List Notes 22h, Add Note Data 22i, Delete Note Data 22j, Get Note Data 22k, and Display Note 22k.

Add Note 22a captures a note and adds it to a notes list managed by the Notes Service 20 for a particular application session. In the illustrative embodiment, the note is broadcast as an XML string, where the attributes are encoded in the XML. The Note ID 12a is an XML string which is used to refer to the note object 10 when subsequently accessing the note.

Delete Note 22b deletes a specified note object 10 (including all note-descriptive attributes 12 and note data 14) from the notes list associated with a particular application session.

Add Attributes 22c allows a list of attributes to be added to an existing note object 10. These attributes can either add new attributes for a note object 10 or modify existing note attributes.

Delete Attributes 22d deletes specified attributes from the list of attributes of a note object 10 associated with a Note ID 12a.

Get Note Attribute 22e returns the list of attributes associated with a specified note object 10.

Lock Note 22f locks a note object 10 so that it cannot be modified except by the client who issued the lock to provide access control of the note while in a session. Unlock Note 22g allows the client who issued the lock (or others with appropriate permission) to unlock a note object 10 to allow modifications to the note object 10.

List Notes 22h returns a list of notes, with their associated attributes, that are associated with a particular application session. In the illustrative embodiment, List Notes 22h returns the list of notes including note-descriptive attributes 12 and note data 14 as a series of XML descriptions that are wrapped in start and end tags so that clients can detect the end of the list.

Add Note Data 22i adds data to the note data 14 attribute of a specified note object 10. The note data 14 is a stream of bytes and is not interpreted by the Notes Service 20; however, the proper note-descriptive attributes 12 are set on the note to describe the data.

Delete Note Data 22j deletes the note data 14 associated with a specified note object 10.

Get Note Data 22k returns the note data 14 associated with a specified note object 10. The Note ID 12a is sent to the Notes Services 20 server, and the Note Data 14 associated with the note object 10 identified by the Note ID 12a is returned to the requesting client 15a, ..., 15n. The requesting client 15a, ..., 15n will preferably know the type of data (by querying the note object 10 attributes 12 (such as Note Type 12b). Accordingly, in the illustrative embodiment, only the byte stream of data is returned.

Display Note 22l causes the details of a specified note to be displayed, for example in a pop-up window. In a collaboration environment, Display Note 22l communicates to all connected clients 15a, ..., 15n in a given session to display the details of a specific note object 10 in a display window.

Figure 4:
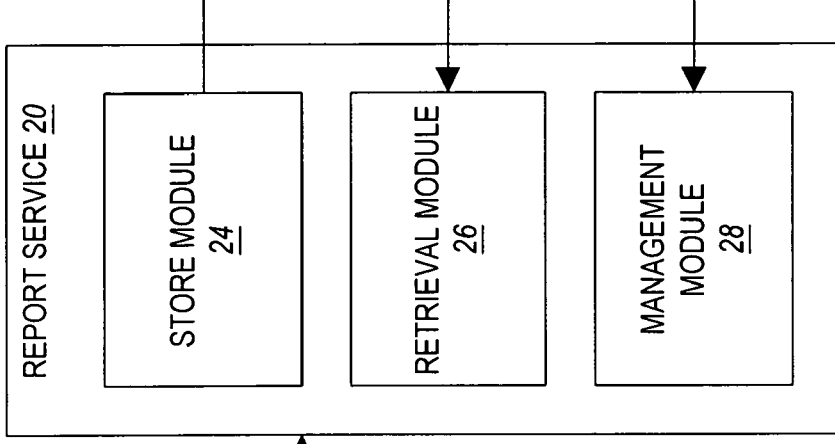
FIG. 4 is a block diagram of an illustrative embodiment of a system employing the Notes Service in accordance with the invention.

FIG. 4 is a block diagram of an illustrative embodiment of a system employing the Notes Service 20 application. As illustrated, Notes Service 20 includes a Store Module 24, a Retrieval Module 26, and a Management Module 28. Application 15 includes a Notes Capture module 22 which provides the capability for capturing not only a user note, but also context information such as the state of the display screen and other note-related information including links to other object types (e.g., a web-site URL, a graphical image file, an audio file, etc.). Capture module 22 captures and bundles the information together for the store 24 and management 28 modules.

Storage module 24 provides the capability for storing captured notes and associated context information in the Notes Database 30 (i.e., persistent storage) for later recall. Notes Database 30 can be implemented in various ways, for example as a relational database or a document management system such as WorkManager, developed by CoCreate Software, Inc.

Retrieval module 26 provides the capability for retrieving information from Notes Database 30. Retrieval module 26 allows the user to specify the type of information to be retrieved using queries, filters and sorts.

Management module 28 allows a user to administer the Notes Database 30. In particular, management module 28 allows a user to modify, delete, and update the status of a note object 10. The updating of a note object 10 can either be accomplished using a versioning algorithm or by modifying the attributes of a given note.

Application 15 typically accesses a data source 16 containing information on which the application operates. For example, application 15 may be a collaboration application such as OneSpace, developed by CoCreate Software, Inc., used to display 3-D models of engineering parts that are stored in a parts database data source. As another example, application 15 may be a personal organizer application storing calendar and contact information in a personal information data source file.

Figure 5:
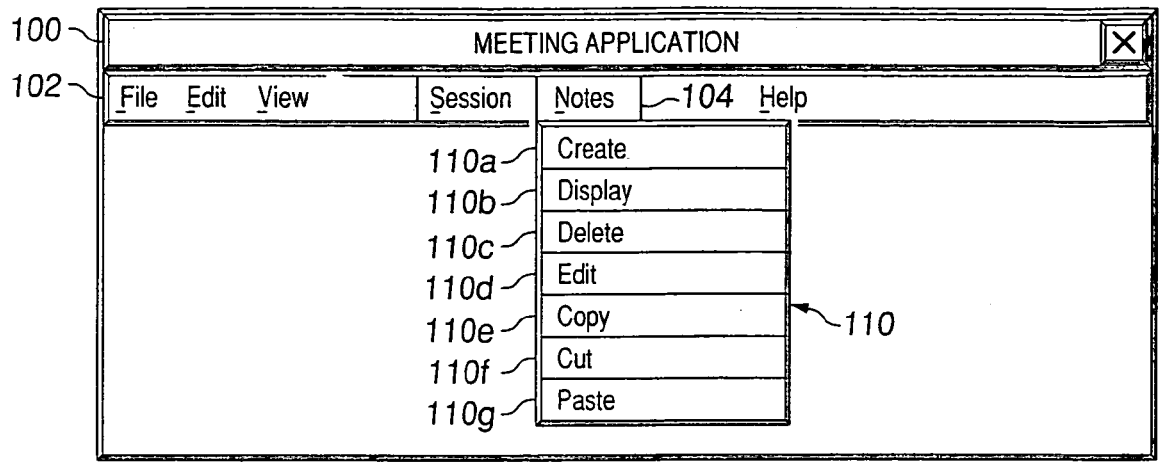
FIG. 5 is an illustrative embodiment of a graphical user interface which provides a user interface for accessing the Notes Service of the invention.

FIG. 5 is an illustrative embodiment of a graphical user interface 100 which provides a user interface for accessing the Notes Service 20 in a computer based meeting application. As illustrated, the Notes Service 20 is accessed via a menu bar 102 that includes menu item 104 labeled "Notes". When selected via a mouse or function key, menu item 104 displays a drop-down menu 110 which displays a menu of selectable Notes Service functions. In the illustrative embodiment, drop-down menu 110 includes Notes Service functions Create 110*a* for creating a note, Display 110*b* for displaying a note, Delete 110*c* for deleting a note, Edit 110*d* for editing a note, Copy 110*e* for copying a note, Cut 110*f* for cutting a note to a clipboard, and Paste 110*g* for pasting a note from the clipboard. Each of these functions 110*a*–110*g* may be initiated by clicking on the desired menu item via a mouse or function key.

Figure 6:
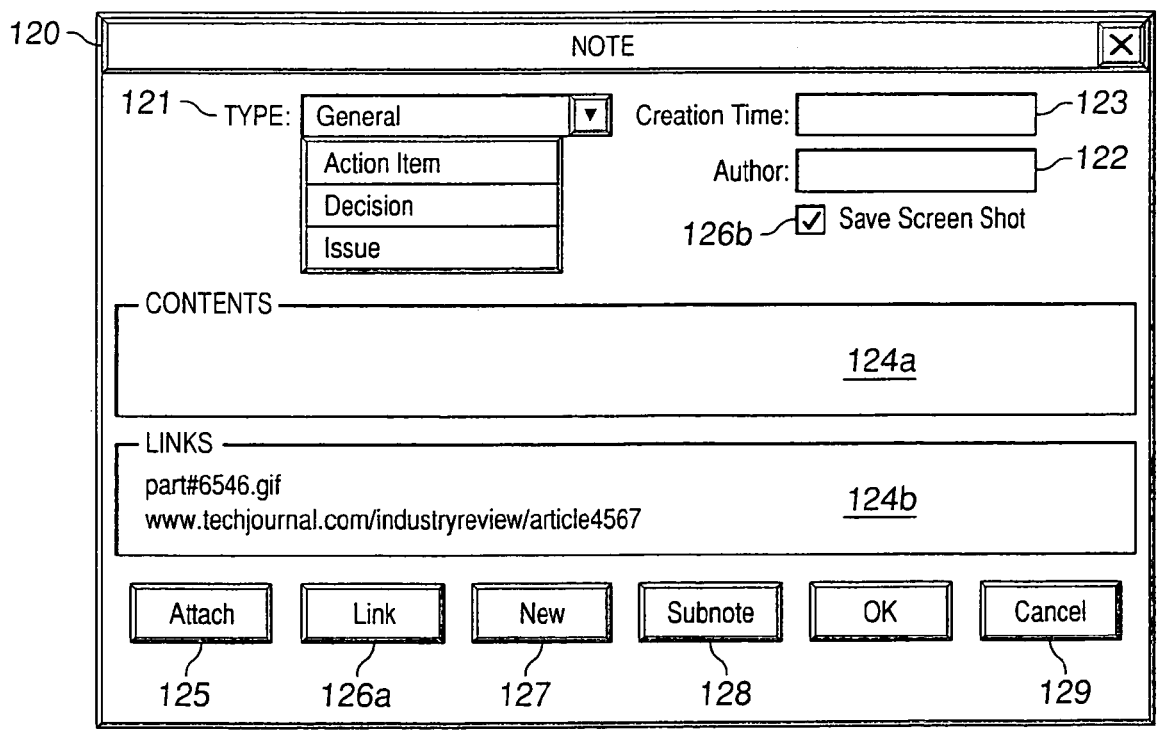
FIG. 6 is a create note dialog in a graphical user interface implemented in accordance with the invention.

FIG. 6 is a create note dialog 120 of the graphical user interface 100 that is displayed when the Create 110*a* menu item has been selected. As illustrated, the create note dialog 120 allows entry of a single note, or succession of single notes by a user of a client application 15. When application 10 is a collaboration application, all members of the same collaboration session preferably have the ability to create a note that may be seen by all other collaboration session members.

The create note dialog 120 includes user capabilities to set the attributes of a note. In particular, the create note dialog 120 allows the user to select the type of note to be created. In the illustrative embodiment, the type of note is selectable via a drop-down menu 121, which allows the user to set the note type to one of either a General Note 121*a*, an Action Item 121*b*, a Decision 121*c*, or an Issue 121*d*. Each note type has a set of note type specific attributes which are displayed in the create note dialog 120 upon selection of the note type by the user. The note type specific attributes include a different set of attributes for each note type. For example, the General Note 121*a* type may display only the standard editable Author attribute 122 and Creation Time attribute 123. These attributes may be filled in by the author of the note, or alternatively may be filled in automatically (with overwrite capability) by the Notes Service 20 using user configuration information. If instead the Action Item type 121*b* is selected, for example, additional editable attributes including an Assigned To attribute 141, a Due Date attribute 142, and a Status attribute 143 (see FIG. 8) may be displayed. Preferably, the create note dialog 120 allow the user to create add note type categories.

In each note type, a content field 124 is displayed. The content field 124 may be filled in by the user and/or a file may be attached to the note via an Attach dialog (not shown) accessed by clicking on an Attach button 125.

In the illustrative embodiment, the create note dialog 120 includes a Link button 126 which allows the user to link the note object to another object (preferably of any type, for example, a 3-D data file, a web-site URL, an audio or video file, a text document, etc.) to create a relation. The links associated with the object note are displayed in a Links display panel 124*b*. In the illustrative embodiment, the Notes Service 20 may automatically create a note and link it to an object used by the client application 15 whenever the object used by the client application 15 is modified. For example, if the client application 15 is a CAD application that creates or utilizes 3-D models of objects, the Notes Service 20 may be configured to automatically generate a note object whenever the 3-D object model is modified, recording the author of the modification and the modification date. A pop-up dialog may prompt the user for a description of the changes made to the 3-D model. User created and automatically created note objects may be stored in separate areas of the Notes database 30 and displayed separately, or may be stored and displayed together, depending on the particular implementation. Preferably, the create note dialog 120 also includes a Save Screen checkbox option 126*b* that allows the user the option of saving the state of the current screen for later viewing to provide context for the current note.

A New button 127 allows a user to create a new note without popping down the current Create Note dialog 120. A Subnote button 128 allows the user to create a subnote to the currently active note, thereby allowing the creation of hierarchical relationships between note objects.

Cancel button 129 allows a user to cancel the current note prior to being stored in the Notes Service 20. If the Cancel button 129 is activated, the currently active note object is discarded—that is, the memory occupied by the currently active note object is freed and it is not saved in persistent storage.

Figure 7:
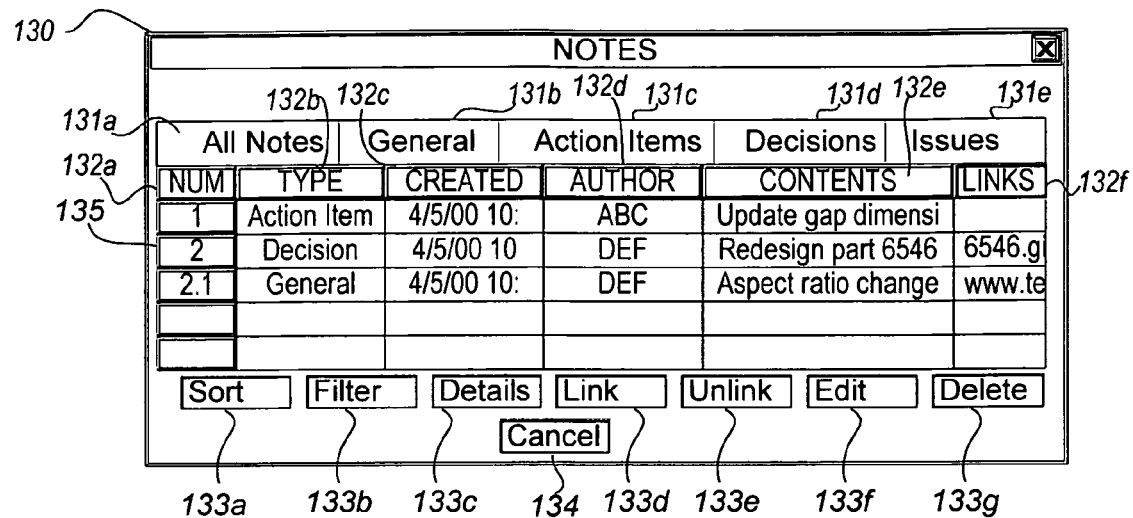
FIG. 7 is a display note dialog in a graphical user interface implemented in accordance with the invention.

FIG. 7 is a display note dialog 130 of the graphical user interface 100 that is displayed when the Display 110*b* menu item of the drop-down menu 110 of the Notes Service functions has been selected. Display notes dialog 130 displays notes created by the client application in a Notes Table 135. If the client application 15 is a collaboration application, the Display Notes dialog 130 displays the note objects created during a specified collaboration session. These notes may be filtered according to type. For example, selecting the All Notes tab 131*a* results in a list of all notes being displayed, regardless of type, selecting the General tab 131*b* results in a list of all the General notes being displayed, selecting the Action Items tab 131*c* results in a list of all the Action Item notes being displayed, selecting the Decisions tab 131*d* results in a list of all the Decision notes being displayed, and selecting the Issues tab 131*e* results in a list of all the Issue notes being displayed.

Display notes dialog 130 allows the user to sort the displayed notes according to various criteria. For example, clicking on the Creation Time header 132*c* sorts the notes in order of Creation Time. Clicking on the Author header 132*d* sorts the notes in terms of Author names in alphabetical order. The other headers may be clicked on to similarly sort the notes in terms of the contents of their respective columns. Notes may also be sorted according to criteria specified in a sort dialog (not shown) accessed by clicking on a Sort button 133*a*.

Display notes dialog 130 may also include filtering capabilities, such as the ability to filter note objects based on a date range for the Creation Time attribute or Last Modified attribute. Filtering capabilities may be configured in a Filter dialog (not shown) accessed by clicking on a Filter button 133*b*.

Figure 8:
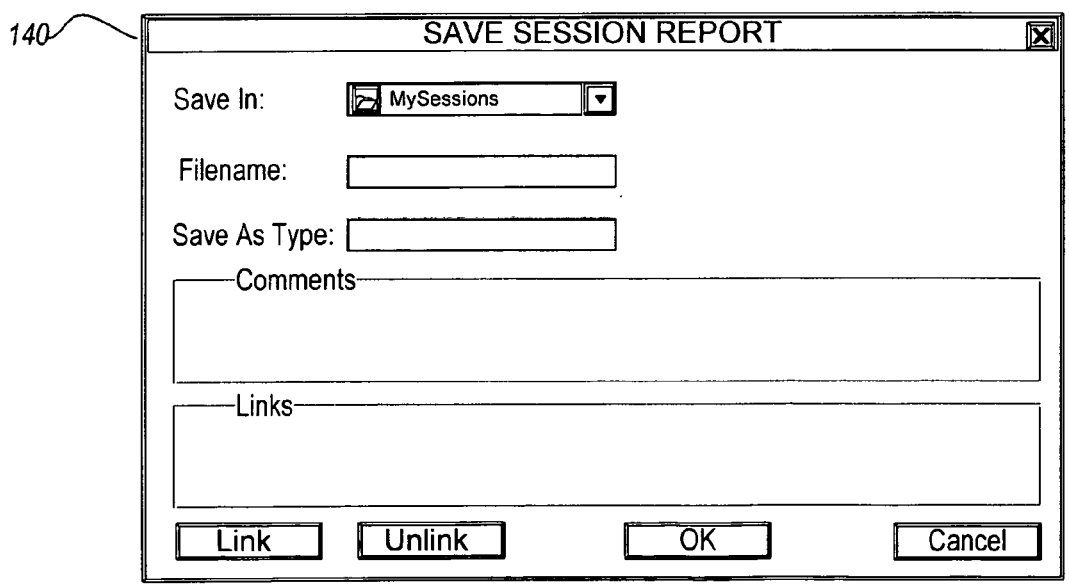
FIG. 8 is a note detail window displayed in a graphical user interface implemented in accordance with the invention.

In the illustrative embodiment, if a note in the Notes Table 135 is double-clicked, or if the note in the Notes Table 135 is selected and then a Detail button 133*c* is clicked, a Note Detail window 140 pops up, illustrated in FIG. 8. Note Detail window 140 displays all attributes and relationships of a selected note object. In the illustrative embodiment, the Note Detail window 140 provides user capability to edit the contents of the attributes in this window, add or delete object links, and/or delete the note entirely. It will be appreciated that different types of note objects (as indicated by the value of the Note Type attribute) will have a different set of attributes. Some attributes will be common among two or more note object types. Furthermore, attributes of each note object may be configured to allow or not allow editing of the attribute.

Figure 9:
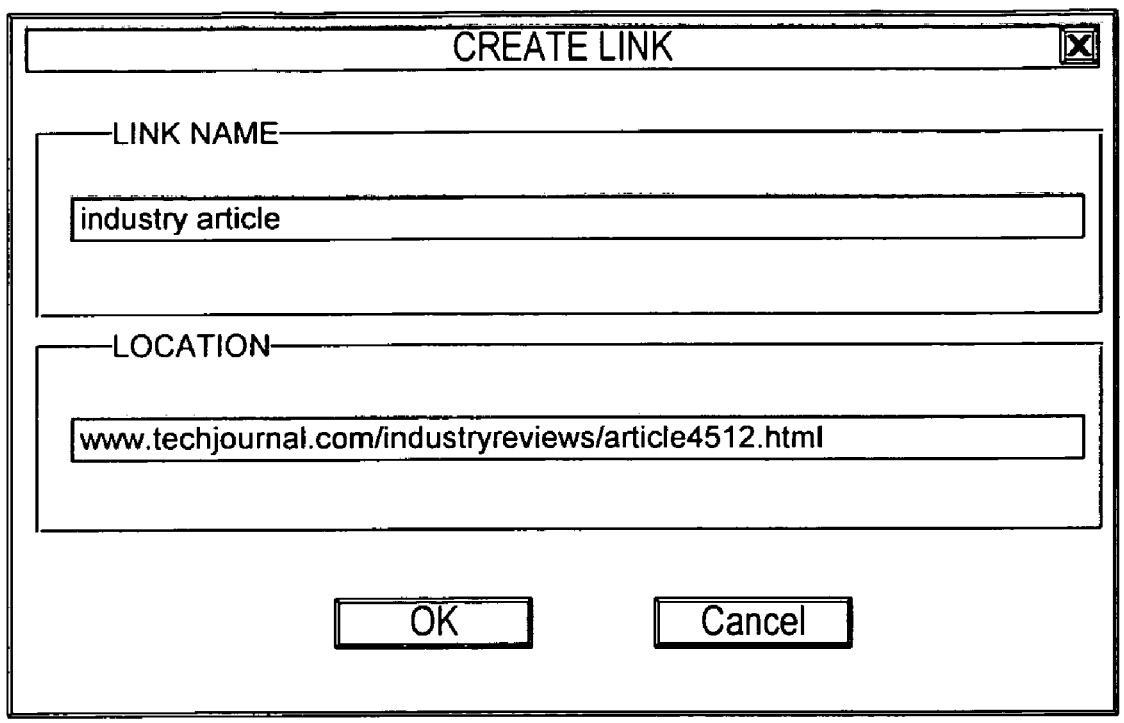
FIG. 9 is a link note dialog in a graphical user interface implemented in accordance with the invention.

Turning back to FIG. 7, in the Display notes dialog 130, a note can be linked to another note or an object of a different type by clicking on the Link button 133*d*, which pops up a Link Note dialog, shown in FIG. 9. An Unlink button 133*e* allow the user to remove a link relationship associated with a selected note object. An Edit button 133*f* may be clicked on to bring up the Note Detail window 140 to allow the user to edit various attributes of a selected note. A Delete button 133*g* allows a user to delete a selected note from the system. Finally, a Cancel button 134 pops down the Display Notes dialog 130.

Figure 10:
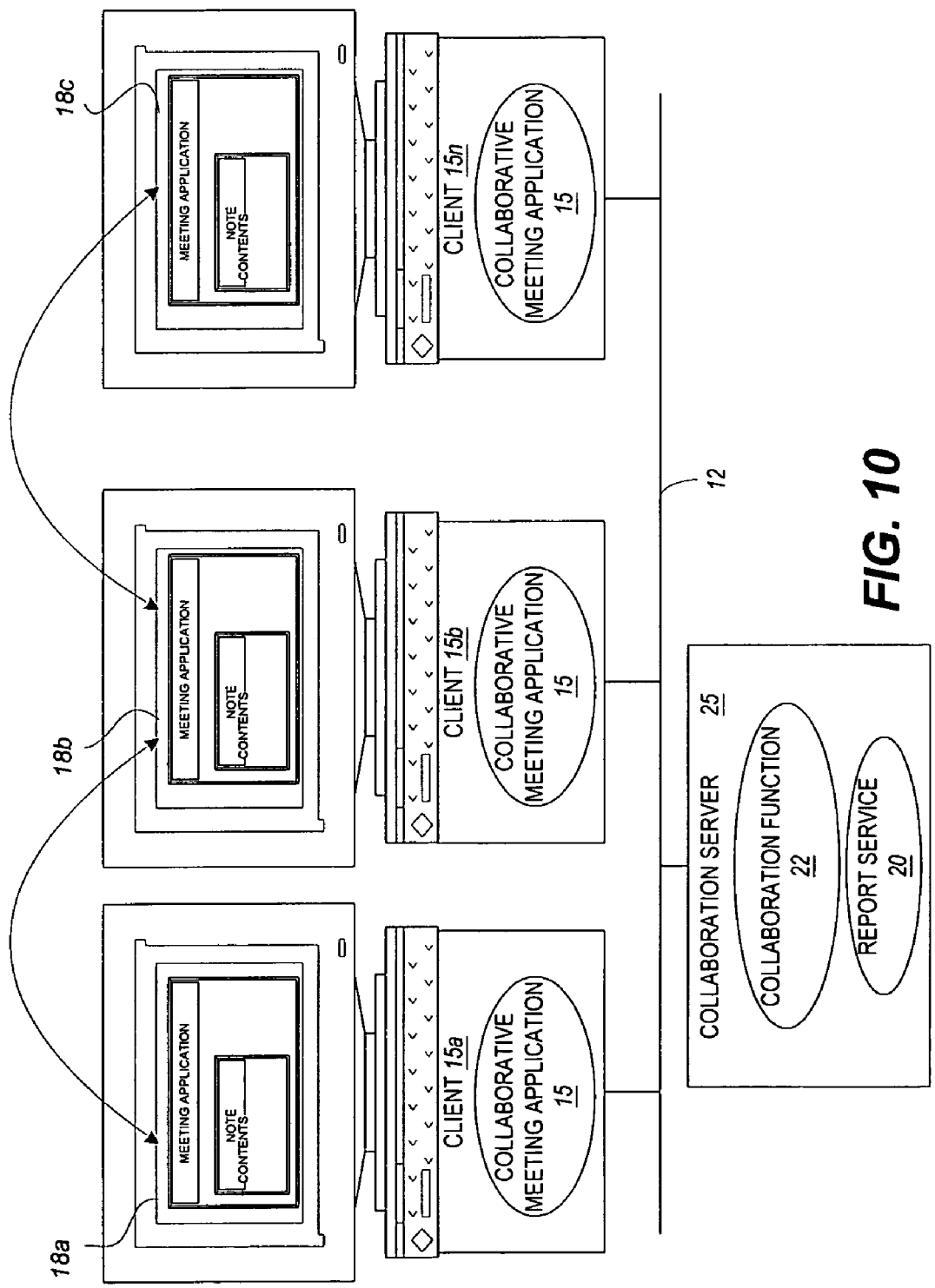
FIG. 10 is a block diagram of a networked collaboration environment which utilizes the Notes Service of the invention.

FIG. 10 is a block diagram of a networked collaboration environment which utilizes the Notes Service 20. As illustrated, a collaboration server 25 executes a collaboration function 22 which synchronizes a plurality of collaborative meeting applications 15 executing on respective clients 15*a*, 15*b*, and 15*n*, which are connected to a network 12 (e.g., the Internet). Collaboration function 22 allows clients 15a, 15b, and 15n to connect to a collaboration session using known collaboration connection techniques, for example, those used in OneSpace, developed by CoCreate Software, Inc. While the collaboration session is open, the respective viewing areas 18a, 18b, 18c on the display of each participating session client 15a, 15b, and 15n are synchronized such that the data viewed in each viewing area 18a, 18b, 18c is displayed at the same time.

In a collaborative environment, notes are public information; when a note object is created, all participant members of the same collaboration session see the note. Likewise, when a note is displayed or a query run, all participant members see the displayed note or query results.

Notes can be related to other objects within a collaboration session, such as CAD geometry (parts, edges, faces, features, assemblies), other notes, a screenshot (static 2D image), or other objects such as markups, documents, and even to objects outside of the application 10.

Figure 11A:
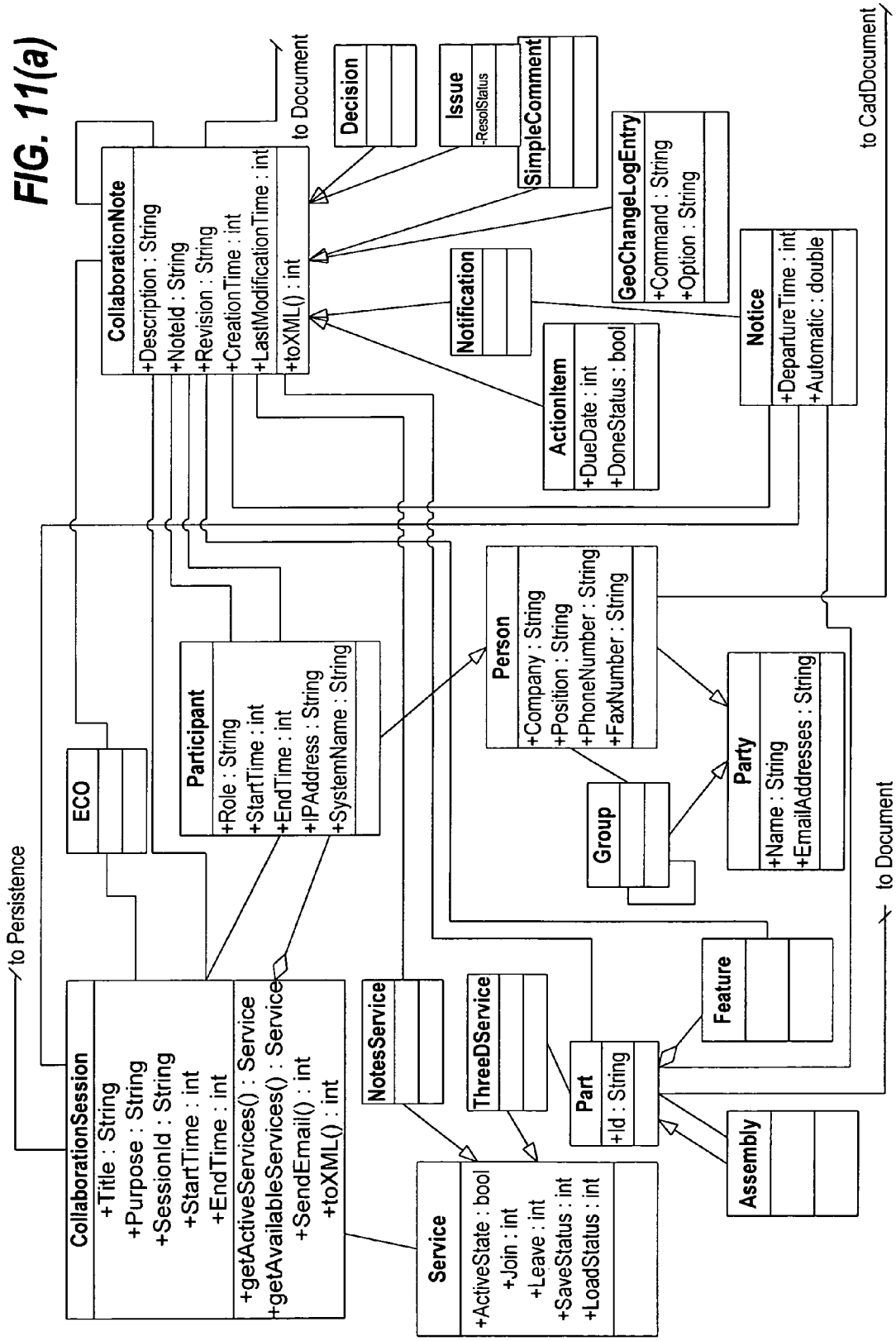
FIGS. 11(a) and 11(b) together are a unified modeling language (UML) diagram of an illustrative embodiment of a Notes Service implemented in accordance with the invention.
Figure 11B:
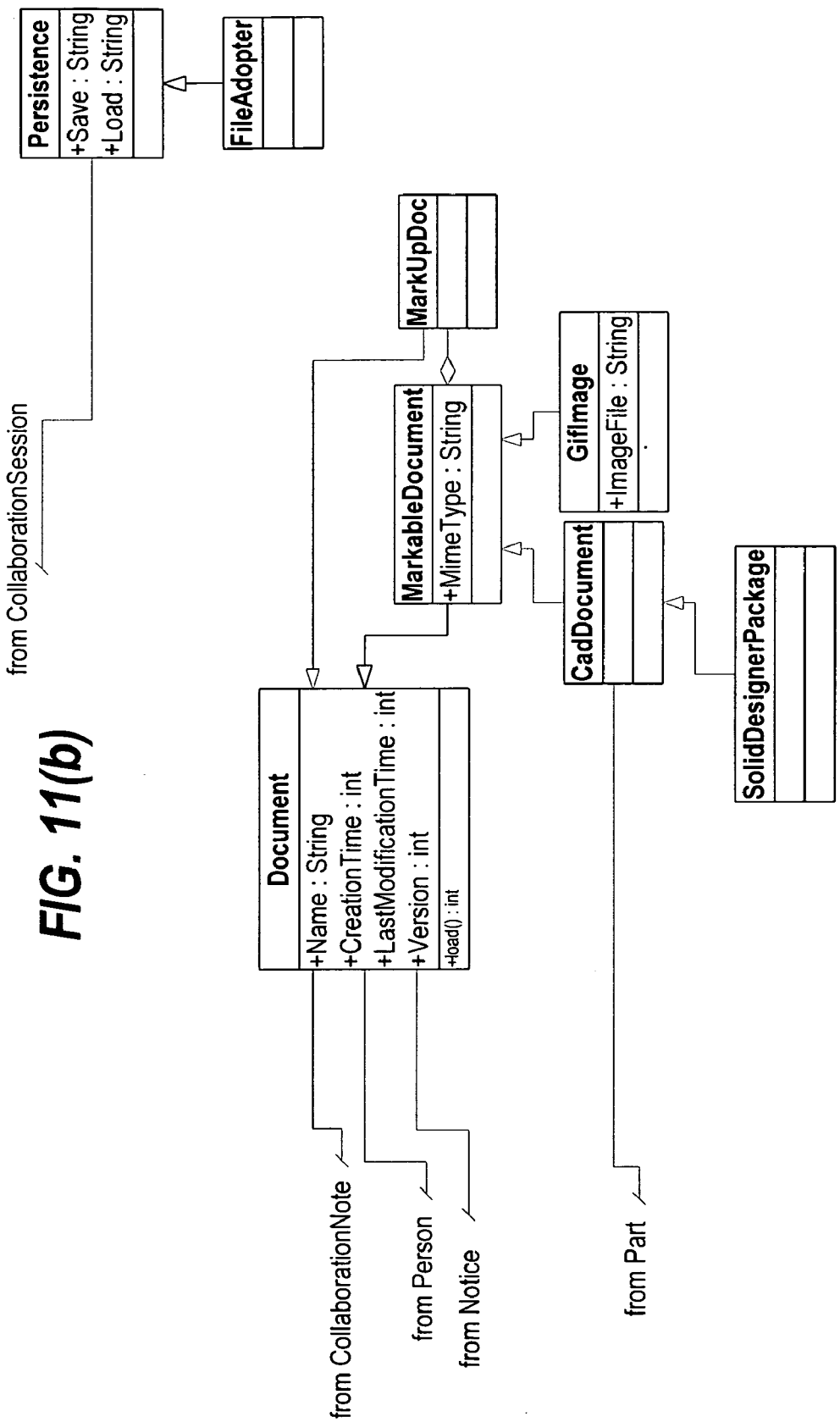

FIGS. 11(a) and 11(b) together illustrate a unified modeling language (UML) diagram of an exemplary embodiment of a Notes Service 20 implemented in accordance with the invention.

FIG. 12 is an example embodiment of a Notes Table 200 implementing a notes list for a particular meeting session. Each notes table 200 is stored in the Notes Database 30. As illustrated, Notes Table 200 in the illustrative embodiment is a relational database wherein each row represents a different note object identified by a Note ID attribute 12a, and each column represents a different attribute of the note object 10. In the illustrative embodiment, a column exists for each possible attribute of every defined note type. Accordingly, in the Notes Table 200, a respective column is mapped to each possible note object attribute, including columns Note Id 201, Note Type 202, Creation Time 203, author 204, Last Modified Time 205, Last Modified By 206, Assigned To 207, Due Date 208, Status 209, and Links List 210.

The Links List field of each note contains a pointer to a linked list of associated note links. Alternatively, the links associated with various notes are implemented in a separate Links table, illustrated in FIG. 13, wherein one column of the table represents the Note ID field, and the following columns contain links to other objects (if any) associated with the note object identified by the Note ID. For example, Note ID value A associates the linked list in the Links table with the Note object in the Notes table.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A notes service for a computer aided design (CAD) application stored on a memory, comprising:
   a note creation module which captures an electronic note associated with a change in a three-dimensional model of said CAD application;
   a note storage module which stores said captured note and an associated data file for later retrieval; and
   a note retrieval module for retrieving and displaying said captured note with a display screen of said three-dimensional model, that existed when said note was generated, using said associated data file.

2. The notes service of claim 1, wherein said note retrieval module receives a query condition and retrieves said captured note and associated data file if said note meets said query condition.

3. The notes service of claim 1, comprising:
   a note management module which enables a user to modify a captured note.

4. The notes service of claim 1, comprising:
   a collaboration function which allows a plurality of collaboration session members to synchronously view a graphical user interface of said notes service.

5. A method for capturing and managing electronic notes in a computer aided design (CAD) based application, comprising:
   capturing a note in a note object;
   associating a data file with said captured note, wherein said data file is used to generate a display of a three-dimensional model of said CAD application that existed when said note was captured;
   storing said note object and said associated data file in persistent storage for later retrieval;
   receiving a query condition; and
   retrieving said note object and said associated data file if attributes of said note object meet said query condition.

6. The method of claim 5, comprising:
   displaying said note captured in said note object.

7. The method of claim 6, comprising:
   presenting said display of said three-dimensional model using said data file.

8. The method of claim 5, comprising:
   capturing a second note and linking said second captured note to said captured note in an hierarchical relationship.

9. The method of claim 5, comprising:
   connecting to a collaboration session; and
   synchronously displaying a notes service graphical user interface to all members connected to said collaboration session.

10. The method of claim 9, comprising:
    locking said note to prevent other members of said collaboration session from changing said note.

11. A computer readable storage medium tangibly embodying program instructions implementing a method for capturing and managing electronic notes in a computer based application the method comprising the steps of:
    capturing a note in a note object;
    associating a data file with said captured note, wherein said data file is used to generate a display of a three-dimensional model of said CAD application that existed at the time the note was captured;
    receiving a query condition; and
    retrieving said note object and said associated data file if attributes of said note object meet said query condition.

12. The computer readable storage medium of claim 11, the method comprising:
    storing said note object and said associated data file in persistent storage for later retrieval.

13. The computer readable storage medium of claim 11, the method comprising:
    displaying said note captured in said note object.

14. The computer readable storage medium of claim 11, the method comprising:
    presenting said display of said three-dimensional model using said data file.

15. The computer readable storage medium of claim 11, the method comprising:
    capturing a second note and linking said second captured note to said captured note in an hierarchical relationship.

16. The computer readable storage medium of claim 11, the method comprising:
  connecting to a collaboration session; and
  synchronously displaying a notes service graphical user interface to all members connected to said collaboration session.

17. The computer readable storage medium of claim 16, the method comprising:
  locking said note to prevent other members of said collaboration session from changing said note.

* * * * *

UNITED STATES PATENT AND TRADEMARK OFFICE
CERTIFICATE OF CORRECTION

PATENT NO.       : 7,392,484 B1  
APPLICATION NO.  : 09/687774  
DATED            : June 24, 2008  
INVENTOR(S)      : Daniel Garfinkel et al.

It is certified that error appears in the above-identified patent and that said Letters Patent is hereby corrected as shown below:

In column 3, line 34, delete "22$k$" and insert -- 22$l$ --, therefor.

In column 8, line 44, in Claim 11, after "application" insert -- , --.

Signed and Sealed this

Twenty-third Day of December, 2008

JON W. DUDAS  
*Director of the United States Patent and Trademark Office*